(12) United States Patent
Ragunathan et al.

(10) Patent No.: US 8,214,506 B2
(45) Date of Patent: Jul. 3, 2012

(54) PROVIDING CONTENT TO CLIENT DEVICE

(75) Inventors: Ravichandran Ragunathan, Ladera Ranch, CA (US); Attaullah Seikh, Irvine, CA (US); Rajini Bala Giridharagopal, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 12/824,112

(22) Filed: Jun. 25, 2010

(65) Prior Publication Data

US 2011/0320610 A1 Dec. 29, 2011

(51) Int. Cl.
*G06F 15/16* (2006.01)
*G06F 15/173* (2006.01)
*G06F 15/177* (2006.01)

(52) U.S. Cl. ........ 709/227; 709/203; 715/700; 705/7.27

(58) Field of Classification Search .......... 709/200–203, 709/217–228; 715/700; 705/7.27
See application file for complete search history.

(56) References Cited

U.S. PATENT DOCUMENTS

| | | | |
|---|---|---|---|
| 6,742,043 B1 | 5/2004 | Moussa et al. | |
| 7,072,984 B1 | 7/2006 | Polonsky et al. | |
| 7,360,210 B1 | 4/2008 | Vacanti et al. | |
| 7,502,862 B2 | 3/2009 | Sahuc et al. | |
| 7,519,917 B2 * | 4/2009 | Lewis-Bowen et al. | 715/772 |
| 7,620,892 B2 | 11/2009 | Rainero et al. | |
| 7,646,761 B2 | 1/2010 | Taylor et al. | |
| 7,657,651 B2 | 2/2010 | Amini et al. | |
| 7,831,693 B2 * | 11/2010 | Lai | 709/220 |
| 7,917,647 B2 * | 3/2011 | Cooper et al. | 709/233 |
| 7,991,764 B2 * | 8/2011 | Rathod | 707/713 |
| 7,991,840 B2 * | 8/2011 | Boyer et al. | 709/205 |
| 8,010,608 B2 * | 8/2011 | Paramasivam et al. | 709/206 |
| 8,041,760 B2 * | 10/2011 | Mamou et al. | 709/200 |
| 8,060,553 B2 * | 11/2011 | Mamou et al. | 709/203 |
| 8,069,435 B1 * | 11/2011 | Lai | 717/106 |
| 8,090,611 B2 * | 1/2012 | Hodges et al. | 705/7.27 |
| 8,095,574 B2 * | 1/2012 | Boyer et al. | 707/805 |
| 8,108,834 B2 * | 1/2012 | Oren et al. | 717/117 |
| 8,117,278 B2 * | 2/2012 | Maes | 709/217 |
| 8,117,335 B2 * | 2/2012 | Maes | 709/238 |
| 2001/0029523 A1 | 10/2001 | Mcternan et al. | |

(Continued)

OTHER PUBLICATIONS

Haratsch, "A client-server architecture for providing client-specific, interactive network services on the application layer", in proceedings of APC 2001, pp. 1-10 (2001), Dec. 31.

(Continued)

*Primary Examiner* — Haresh N Patel
(74) *Attorney, Agent, or Firm* — Fitzpatrick, Cella, Harper & Scinto

(57) ABSTRACT

Content is provided to a client device. A request is received from the client device at a content management service which has access to a database of content and a database of devices on a network. The request identifies content requested by a client. The content management service designates a content source. Capability information is received from the client device. The content management service determines whether the client device has capabilities corresponding to the content identified by the request, using the capability information. Responsive to a determination that the client device has the capabilities, the client device is provided with information to facilitate direct communication between the client device and the content source. Responsive to a determination that the client device does not have the capabilities, a communication channel is constructed between the client device and one or more other devices which have capabilities corresponding to the content.

68 Claims, 6 Drawing Sheets

U.S. PATENT DOCUMENTS

| | | |
|---|---|---|
| 2006/0182100 A1 | 8/2006 | Li et al. |
| 2007/0156878 A1* | 7/2007 | Martin et al. ................. 709/223 |
| 2007/0157088 A1* | 7/2007 | Lewis-Bowen et al. ...... 715/700 |
| 2008/0126987 A1* | 5/2008 | Meschian et al. ............. 715/825 |
| 2008/0180729 A1* | 7/2008 | LaVigne et al. ............. 358/1.15 |
| 2008/0189401 A1* | 8/2008 | Maes ........................... 709/223 |
| 2009/0171729 A1* | 7/2009 | Anisimov et al. ................. 705/8 |
| 2009/0241117 A1* | 9/2009 | Dasgupta et al. ............. 718/101 |

OTHER PUBLICATIONS

Ford, et al., "Peer-to-Peer Communication Across Network Address Translators", in Proceedings of USENIX 2005 Annual Technical Conference (2005), Dec. 31, pp. 1-15.

* cited by examiner

PROVIDING CONTENT TO CLIENT DEVICE

FIELD

The present disclosure relates to providing content to a client device, and more particularly relates to facilitating communication between a client device and a content source.

BACKGROUND

In the field of digital media and content, it is common to facilitate communication between a client device and a content source. For example, a client device may lack capabilities to directly access a particular content source. Accordingly, other devices or services may be enlisted to aid the client in accessing the content source.

One method of facilitating communication between a client and a source is to incorporate a proxy device which sits between clients and sources. The proxy device fetches contents from the sources, and streams the contents to requesting clients. In this way, the proxy device can provide content that a client can not access on its own.

SUMMARY

One problem with such techniques is that they ordinarily use a "one size fits all" philosophy which assumes that all clients have no capabilities. Thus, the proxy device assumes all of the capabilities required by each client for each respective client request, leading to significant processing load on the proxy device and bottlenecks.

While the proxy device may attempt to reduce its processing loads somewhat by enlisting other devices on the network, such attempts ordinarily do not account for the client's capabilities. Thus, such attempts may be ineffective if the client still does not have the necessary capabilities to access the content.

The foregoing situations are addressed by selectively providing direct or indirect communication with a content source, based on whether a client has capabilities corresponding to the content requested from the source.

Thus, in an example embodiment described herein, content is provided to a client device which communicates with other devices over a network. A request is received from the client device at a content management service which maintains a database of content on the network and devices on the network. The request identifies content requested by a client. The content management service designates a content source which stores the content identified by the request. Capability information is received from the client device. The content management service determines whether the client device does or does not have capabilities corresponding to the content identified by the request, using the capability information. Responsive to a determination that the client device has capabilities corresponding to the content identified by the request, the client device is provided with information to facilitate direct communication between the client device and the content source over the network. Responsive to a determination that the client device does not have capabilities corresponding to the content identified by the request, a communication channel is constructed over the network between the client device and one or more other devices which have capabilities corresponding to the content identified by the request.

By facilitating different types of communication (e.g., direct or indirect) based on whether a client has capabilities corresponding to requested content, it is ordinarily possible to reduce bottlenecks by distributing content across multiple channels. In addition, to the extent that there is facilitation of direct communication between a client device and a content source, it is ordinarily possible to ensure that a client device has adequate capabilities to process such direct communication.

This brief summary has been provided so that the nature of this disclosure may be understood quickly. A more complete understanding can be obtained by reference to the following detailed description and to the attached drawings.

DETAILED DESCRIPTION

Figure 1:
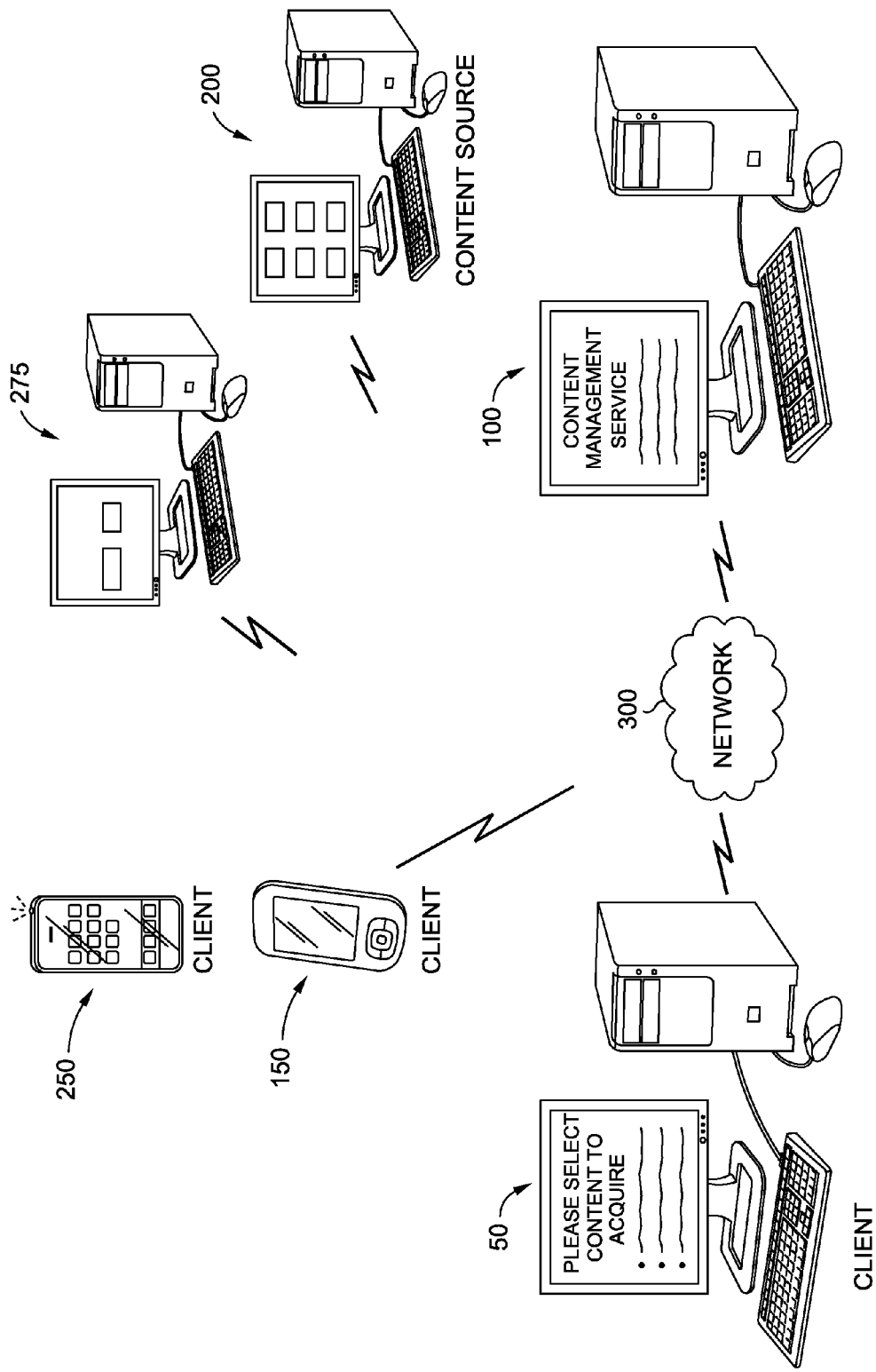
FIG. 1 illustrates an example embodiment of an environment in which aspects of the present disclosure may be practiced.

FIG. 1 illustrates an example environment in which aspects of the present disclosure may be practiced. Computer 100 hosts a content management service, and generally comprises a programmable general purpose personal computer having an operating system, such as Microsoft® Windows® or Apple® Mac OS® or LINUX, and which is programmed as described below so as to perform particular functions and, in effect, become a special purpose computer when performing these functions.

As shown in FIG. 1, computer 100 executes a content management service which facilitates communication between clients and content sources, as discussed more fully below. In that regard, computer 100 is connected to client computer 50, client PDA 150, client mobile phone 250, content source 200 and device 275 via network 300.

While FIG. 1 depicts a computer, computing equipment for practicing aspects of the present disclosure can be implemented in a variety of embodiments. For example, computer 100 can be embodied as a number of devices, including, for example, a personal digital assistant (PDA), a cellular telephone, or a portable media player, among many other embodiments.

Computer 100 also includes computer-readable memory media, such as fixed disk 45 (shown in FIG. 2), which is constructed to store computer-readable information, such as computer-executable process steps or a computer-executable program for causing computer 100 to perform a method for providing content to a client device, as described more fully below.

Client computer 50, PDA 150 and mobile phone 250 are examples of clients which may communicate with the content management service at computer 100 to receive content. As shown in FIG. 1, client computer 50 is architected as a desktop PC, although other types of computers such as a laptop or netbook could also serve as a client. PDA 150 is a personal data assistant and mobile phone 250 is a cellular telephone, both of which can which may connect to network 300 in order to receive and display media content. Of course, any number of other devices can also serve as clients on network 300.

Each of client computer 50, PDA 150 and mobile phone 250 may have limited capabilities in regards to accessing content over a network. In particular, each client may require additional services to access content across network 300. These additional services are managed by the content management service on computer 100 and may be provided by additional devices such as device 275, as described more fully below.

Content source 200 is an example of a device storing content, such as media content, which can be accessed (directly or indirectly) by client devices. As shown in FIG. 1, content source 200 may be architected as a general purpose PC which stores content, but content source 200 could also be embodied as a number of other devices, including, for example, a personal digital assistant (PDA), a computer, a cellular telephone, or a portable media player, among many other embodiments. Alternatively, if content source 200 is a large-scale content repository, content source 200 may be embodied in a device with more storage space, such as a high-end server or a disk array.

Device 275 is a device which may be enlisted by the content management service to provide services on behalf of a client device, and more specifically to provide services to compensate for capabilities that the client device lacks. For example, device 275 may be enlisted by the content management service to provide transcoding capabilities lacked by a client device.

For purposes of conciseness, only client computer 50, computer 100, client PDA 150, client mobile phone 250, content source 200 and other device 275 are shown in FIG. 1, but any number and type of devices may exist on network 300. In particular, it should be appreciated that a much larger and/or more diverse assortment of client devices and content sources may exist on network 300, as well as additional devices providing a variety of services. In addition, more than one content management service may exist on network 300.

Network 300 transmits data between client computer 50, computer 100, PDA 150, content source 200, mobile phone 250 and device 275. The implementation, scale and hardware of network 300 may vary according to different embodiments. Thus, for example, network 300 could be the Internet, a Local Area Network (LAN), Wide Area Network (WAN), Metropolitan Area Network (MAN), or Personal Area Network (PAN), among others. Network 300 can be wired or wireless, and can be implemented, for example, as an Optical fiber, Ethernet, or Wireless LAN network. In addition, the network topology of network 300 may vary.

Figure 2:
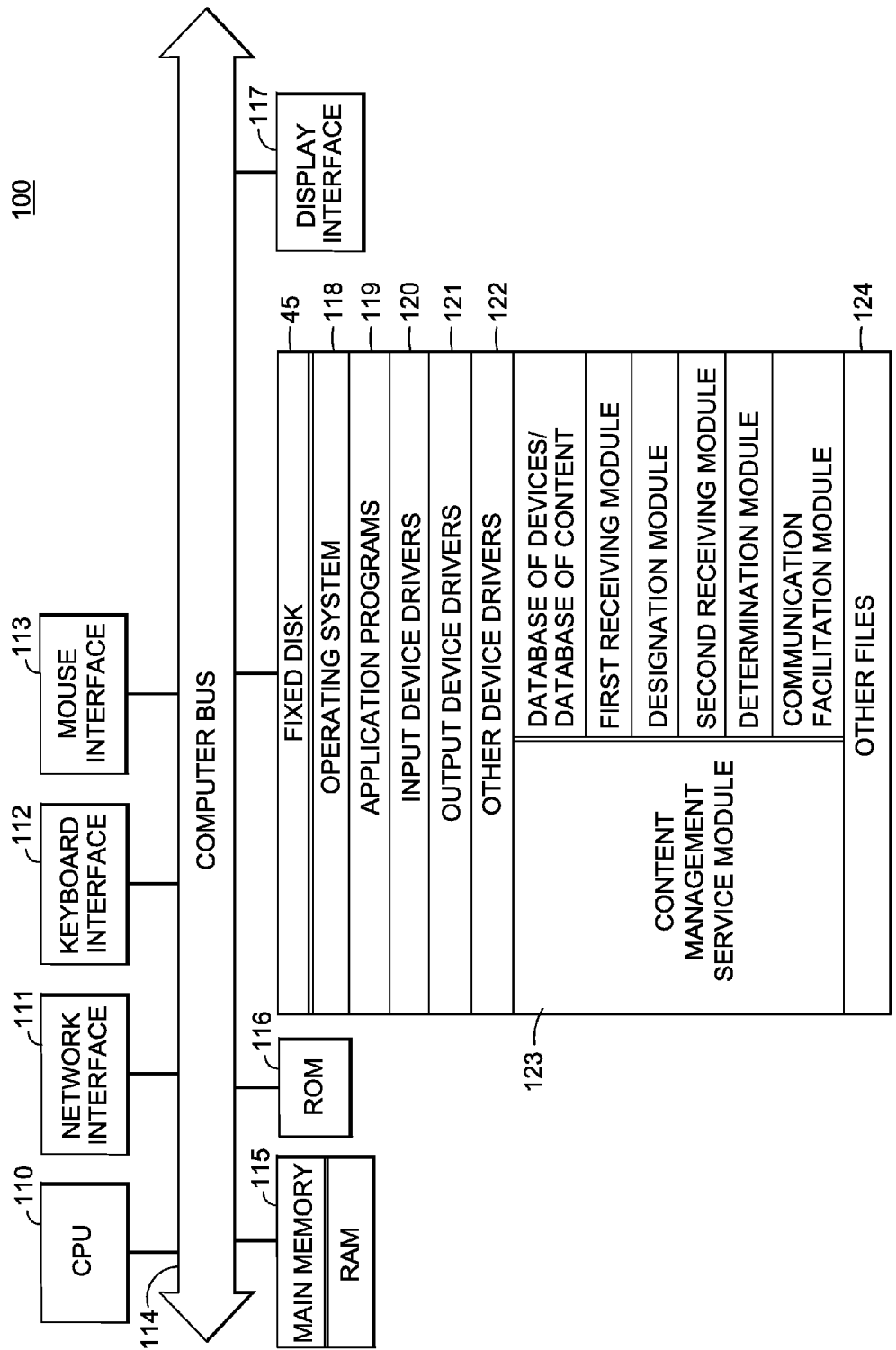
FIG. 2 is a detailed block diagram depicting the internal architecture of the computer shown in FIG. 1.

FIG. 2 is a detailed block diagram depicting the internal architecture of the computer shown in FIG. 1.

As shown in FIG. 2, computer 100 includes central processing unit (CPU) 110 which interfaces with computer bus 114. Also interfacing with computer bus 114 are fixed disk 45 (e.g., a hard disk or other nonvolatile storage medium), network interface 111 for communicating with other devices across network 300, keyboard interface 112, mouse interface 113, random access memory (RAM) 115 for use as a main run-time transient memory, read only memory (ROM) 116, and display interface 117 for a display screen or other output.

RAM 115 interfaces with computer bus 114 so as to provide information stored in RAM 115 to CPU 110 during execution of the instructions in software programs, such as an operating system, application programs, a content management service module, and device drivers. More specifically, CPU 110 first loads computer-executable process steps from fixed disk 45, or another storage device into a region of RAM 115. CPU 110 can then execute the stored process steps from RAM 115 in order to execute the loaded computer-executable process steps. Data, such as content requests received on network 300, or other information, can be stored in RAM 115 so that the data can be accessed by CPU 110 during the execution of the computer-executable software programs, to the extent that such software programs have a need to access and/or modify the data.

As also shown in FIG. 2, fixed disk 45 contains computer-executable process steps for operating system 118, and application programs 119, such as image management or display programs. Fixed disk 45 also contains computer-executable process steps for device drivers for software interface to devices, such as input device drivers 120, output device drivers 121, and other device drivers 122. Other files 124 are available for output to output devices and for manipulation by application programs.

Content management service module 123 comprises computer-executable process steps for providing content to a client device, and generally comprises databases of content on the network and devices on the network, a first receiving module, a designation module, a second receiving module, a determination module, and a communication facilitation module. Content management service module 123 is configured to selectively provide direct or indirect communication between a client device and a content source, based on whether the client device has capabilities corresponding to the content requested from the source.

The computer-executable process steps for content management service module 123 may be configured as part of operating system 118, as part of an output device driver, such as a display processing driver, or as a stand-alone application program. Content management service module 123 may also be configured as a plug-in or dynamic link library (DLL) to the operating system, device driver or application program. It can be appreciated that the present disclosure is not limited to these embodiments and that the disclosed modules may be used in other environments.

Figure 3:
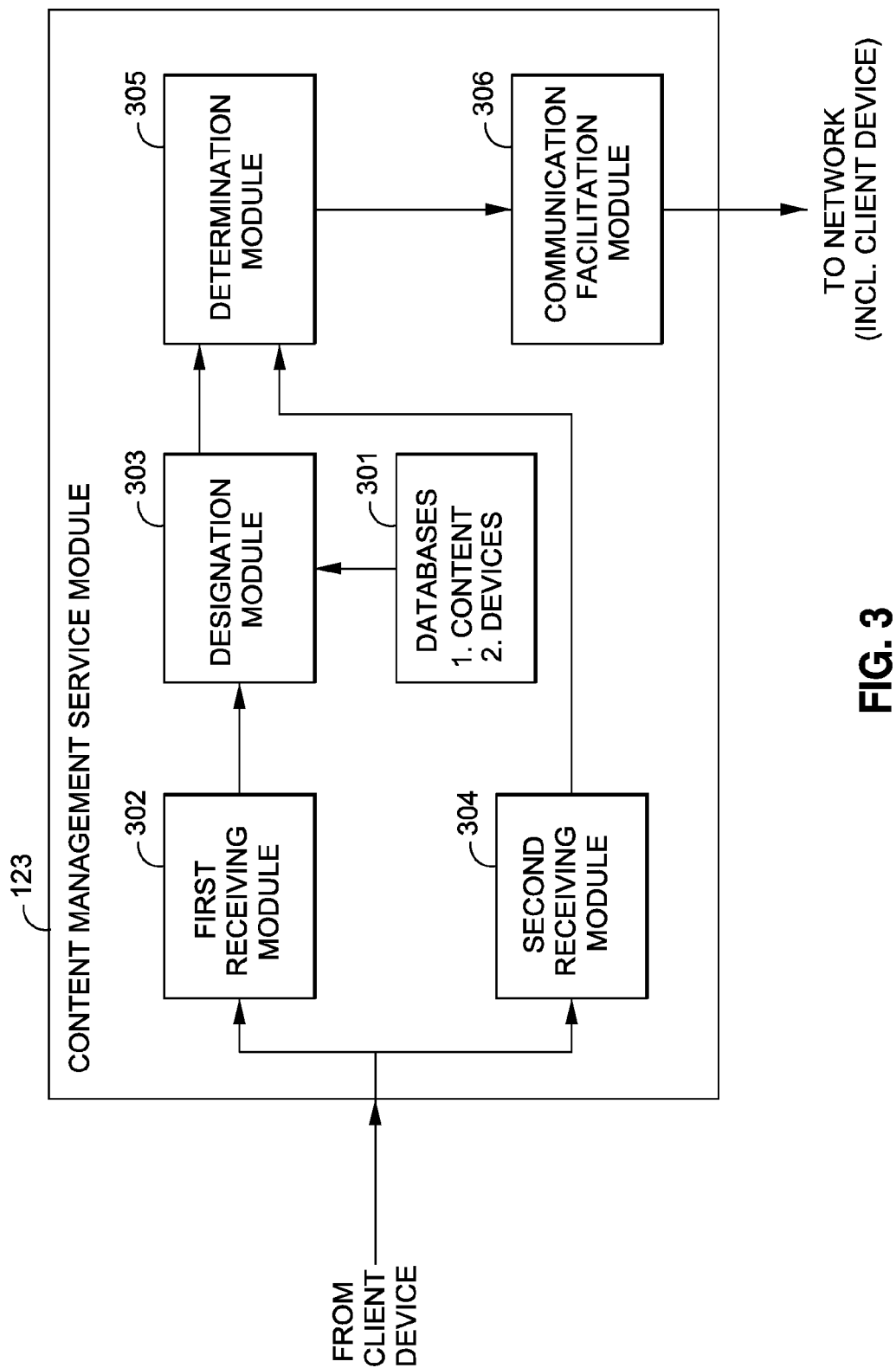
FIG. 3 illustrates a content management service module according to an example embodiment.

FIG. 3 illustrates an example of content management service module 123 in which the sub-modules of content management service module 123 are included in fixed disk 45. Each of the sub-modules are computer-executable software code or process steps executable by a processor, such as CPU 110, and are stored on a computer-readable storage medium, such as fixed disk 45 or RAM 115. More or less modules may be used, and other architectures are possible.

As shown in FIG. 3, content management service module 123 includes databases 301 which maintains a database of content on the network and a database of devices on the network. The databases may be constructed prior to a client request by executing a discovery process to aggregate a list of the content and devices on the network, as discussed more fully below.

While FIG. 3 depicts databases 301 as stored in content management service module 123, it should be understood that the databases may be stored elsewhere, and content management service module 123 can simply access the databases. For example, the databases could be located elsewhere on fixed disk 45, or could be located remotely.

Content management service module 123 also includes a first receiving module 302 for receiving a request from a client device. The request identifies content requested by a client, and is provided to designation module 303 to designate an appropriate content source.

Additionally, content management service module 123 includes a designation module 303 for designating a content source which stores the content identified by the request. The designation module accesses databases 301 to discover which content source(s) should be used to satisfy the client request.

In addition, content management service module 123 also includes a second receiving module 304 for receiving capability information from the client device. The capability information is transmitted to determination module 305 to determine whether the client has capabilities corresponding to the content identified by the request.

Content management service module 123 also includes a determination module 305 for determining whether the client device does or does not have capabilities corresponding to the content identified by the request. The determination is made using the capability information.

Further, content management service module 123 includes a communication facilitation module 306 for providing the client device with information to facilitate direct communication between the client device and the content source over the network, responsive to a determination that the client device has capabilities corresponding to the content identified by the request, and for constructing a communication channel over the network between the client device and one or more other devices which have capabilities corresponding to the content identified by the request, responsive to a determination that the client device does not have capabilities corresponding to the content identified by the request. The above processes will be described in more detail below.

Figure 4:
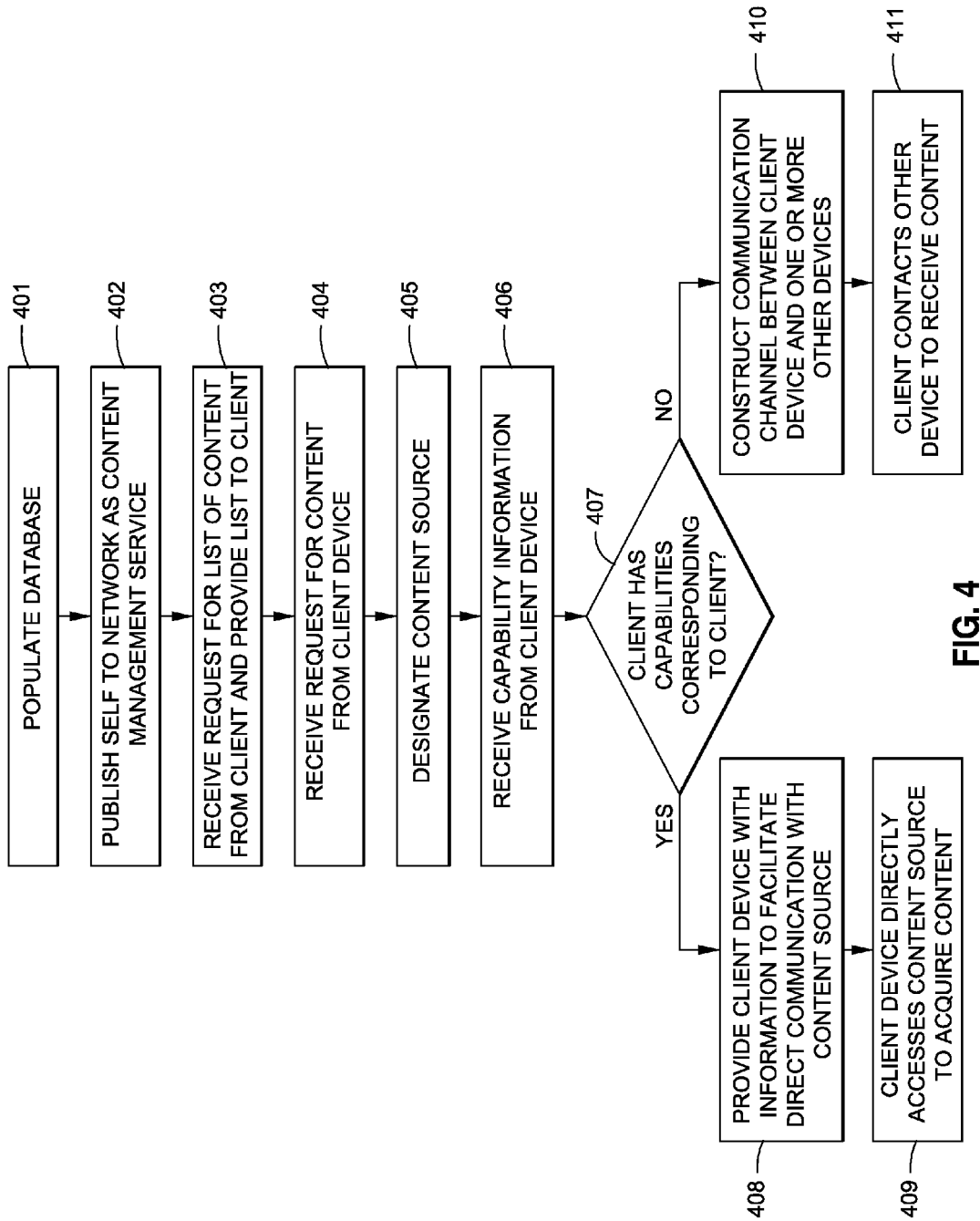
FIG. 4 is a flowchart illustrating a process for providing content to a client device according to an example embodiment.

FIG. 4 is a flowchart illustrating an example process for providing content to a client device according to an example embodiment.

Briefly, in FIG. 4, content is provided to a client device which communicates with other devices over a network. A request is received from the client device at a content management service which has access to a database of content on the network and a database of devices on the network. The request identifies content requested by a client. The content management service designates a content source which stores the content identified by the request. Capability information is received from the client device. The content management service determines whether the client device does or does not have capabilities corresponding to the content identified by the request, using the capability information. Responsive to a determination that the client device has capabilities corresponding to the content identified by the request, the client device is provided with information to facilitate direct communication between the client device and the content source over the network. Responsive to a determination that the client device does not have capabilities corresponding to the content identified by the request, a communication channel is constructed over the network between the client device and one or more other devices which have capabilities corresponding to the content identified by the request.

In more detail, in step 401, the content management service populates a database of content on the network and a database of devices on the network.

In particular, in order to provide the metadata list of content to the client, the content management service may discover the locations of content and corresponding devices on the network prior to receiving the client request, and aggregate these locations into databases. Additionally, the content management service may discover and aggregate the locations of devices providing services (e.g., transcoding) on the network.

Discovery of devices providing services and content can be achieved through a number of discovery methods. In one example method, discovery is accomplished through two intrinsic services that run on each network device: a node service and a service repository service. The service repository service maintains a list of services available on the network and addresses of devices that host such services. The node service manages synchronized access to the service list of the service repository service, so as to provide consumers on the device with the list of services.

According to the above discovery method, services and content may be synchronized between nodes on a network by multicasting a change notification responsive to a change in the services available locally at the network-enabled devices, and by listening to multicasts of change notifications from peer nodes. Each node on the network may multicast a persistent globally unique identifier (SyncGUID) corresponding to the nature and type of services available at a node. For further details, please see U.S. application Ser. No. 12/717,862, filed Mar. 4, 2010, the contents of which are incorporated herein by reference.

Thus, before the client sends the request, the content management service discovers which devices on the network store which content, as well as which devices on the network provide services needed to satisfy the request. The information obtained therefrom is used to populate databases of content and devices providing services on the network. Alternatively, the databases can be hardcoded in the content management service, or can be set beforehand by a user.

In that regard, although the population of the databases of content and devices providing network services is shown in FIG. 4 as a single step, the population of the databases may be ongoing, so as to ensure that the information is current.

The actual backend storage of the content and device entries can be different for different implementations and platforms. For example, some implementations might use a persistent storage mechanism such as a database, and some might use transient in-memory hash tables.

In step 402, the content management service registers itself as such, and publishes itself to the network as a content management service. Accordingly, client devices are made aware of the content management service.

In step 403, a request is received from a client device for a list of content, and the content management service provides the list of content to the client device. In particular, the client device requests a metadata list of content items from the content management service. Thus, the client can be provided with a metadata list of the content available on the network, and the client can select one or more items from the list to obtain. In one example embodiment, the metadata list may also indicate the location of the content management service. In addition, the client may be able to filter results from the content management service, for example by media type.

In step 404, a request for a content is received from the client device at the content management service. The request identifies content requested by a client. In particular, the request may identify particular content from the metadata list.

The client request may also include an indicator of how the client wishes to be informed that the content is ready. Specifically, the request may include a callback reference, indicating to the content management service which sort of data items should be transferred to the client once the content is ready. For example, the client device may indicate in the request that it wishes to be sent a URL to the content once the content is ready.

In step 405, the content management source designates a content source which stores the content identified by the request. In particular, since the content management source maintains a database of content on the network and locations of devices on the network which store such content, the content management source can identify one or more devices which store the content requested by the client.

In a simple case, the content source may be the content management service itself. In another case, the content management service may designate another device storing the content to act as the content management service. For example, the original content management service may authorize a device storing the content to also act as the content management service. In still another case, the content may be stored on another device. In such a case, the content management service must transmit further information to the client (such as a URL) which allows the client device to access the content source, as described more fully below.

In step 406, the content management service receives capability information from the client device. In that regard, the capability information may be transmitted along with the request for content. The capability information may include, for example, transport protocols available at the client device, content representation formats supported by the client device, bandwidth available for the client device, security credentials of the client device, and whether the client device can perform certain conversions or transcoding.

In step 407, the content management service determines whether the client device does or does not have capabilities corresponding to the content identified by the request.

The determination is made using the capability information. In particular, the content management service determines whether the client device has capabilities corresponding to the content identified by the request by determining whether the client device and the content source can communicate directly.

In that regard, the determination of whether the client device and the content source can communicate directly can be based on one or more of several criteria.

For example, the content management service can determine whether the client device and the content source can communicate directly by determining whether an identity of the network of the client device is the same as an identity of the network of the content source. In such a situation, the content management service determines whether the identity of the network of the client device is the same as the identity of the network of the content source by comparing unique network identifiers which are generated for each network. These unique network identifiers for each network can be respectively generated by the first node activated on each network, or the unique network identifier for each network can be generated by a respective network router node on each network.

In another example, the determination of whether the client device and the content source can communicate directly is performed by determining whether the client device and content source have a transport protocol in common.

In still another example, the content management service determines whether the client device and the content source can communicate directly by determining whether or not the client device and content source both support content in the same content representation format.

In yet another example, the content management service determines whether the client device and the content source can communicate directly by determining whether bandwidth between the client device and the content source allows for adequate consumption of content between the client device and the content source. In this regard, "adequate" may correspond to a particular bandwidth, a particular period of time in which to transfer the content.

In still another example, the content management service determines whether the client device and the content source can communicate directly by determining whether the client device can provide security credentials requested by the content source.

Of course, the above capabilities are only intended to serve as examples, and other capabilities of the client device may be used to determine whether the client can communicate directly with the content source.

In addition, in one embodiment, the content management service determines whether the client device and the content source can communicate directly by enlisting another device. Specifically, the content management service determines whether the client device does or does not have capabilities corresponding to the content identified by the request by forwarding the request and capability information to a workflow/orchestration service on another device. An example of such an embodiment will be described in more detail below with respect to FIG. 6.

If the client device has capabilities corresponding to the content identified by the request, the process proceeds to step 408. If the client device does not have capabilities corresponding to the content identified by the request, the process proceeds to step 410.

In step 408, responsive to a determination that the client device has capabilities corresponding to the content identified by the request, the content management service provides the client device with information to facilitate direct communication between the client device and the content source over the network.

More specifically, the content management service facilitates direct communication between the client device and the content source by providing the client device with location information of the content source, and the client device accesses the content from the content source using the location information. In one example, the location information of the content source may be a URL of the content source.

In step 409, the client device directly accesses the content source using the URL or other location information, and acquires the desired content. For example, the content may be accessible by the client device through a browser or other network application.

In step 410, responsive to a determination that the client device does not have capabilities corresponding to the content identified by the request, the content management service constructs a communication channel over the network between the client device and one or more other devices which have capabilities corresponding to the content identified by the request.

In one example, the content management service constructs the communication channel by informing the client device of a location of one of the other devices providing the service, and the one of the other devices receives the content identified by the request, performs the necessary service(s), and provides the content identified by the request to the client device.

In that regard, the content management service may enlist several other devices to perform services needed to compensate for the missing client capabilities, but the client may only be provided with the location of the final device where the content is stored after all services have been performed. For example, a client may require both transcoding and a separate transmission protocol, but may only receive the location of the device storing the content after both services have been performed. Thus, it is the devices on the network providing the services which originally access the content source, and perform the necessary services (e.g., transcoding) on the content to make the content accessible by the client.

The content management service may enlist the other devices by transmitting instructions to the devices, including which service(s) to perform, as well as the location of a content source to access the content from.

Thus, the content management service uses the functions of network services to perform designated operations, such as transcoding, to facilitate access of the content from the content source. A number of devices used to satisfy a client request can be determined based on a number of capability mismatches between the client capabilities and the content identified by the request. These issues could mean that several external resources and actions are required to satisfy the client request. In that regard, when more than one device is used to satisfy the request, a workflow may be generated by the content management service which includes the services of the devices and the content source, and which ends with the client device receiving the content.

In step 411, the client device accesses the content from the devices on the network which provide the necessary services. Thus, for example, once a device on the network completes a service such as transcoding, the content management service may transmit the location of that device to the client in order to access the content. In that regard, since the device(s) on the network have performed the necessary services the client requires, the content is in a format accessible by the client.

By offloading the services needed for the request to other devices on the network, the burden on the content management service can ordinarily be reduced. Additionally, the client ordinarily does not need to be aware of the additional capabilities it needs to access the content, as the content management service takes care of managing the steps needed to transform the content into something the client can access.

Figure 5:
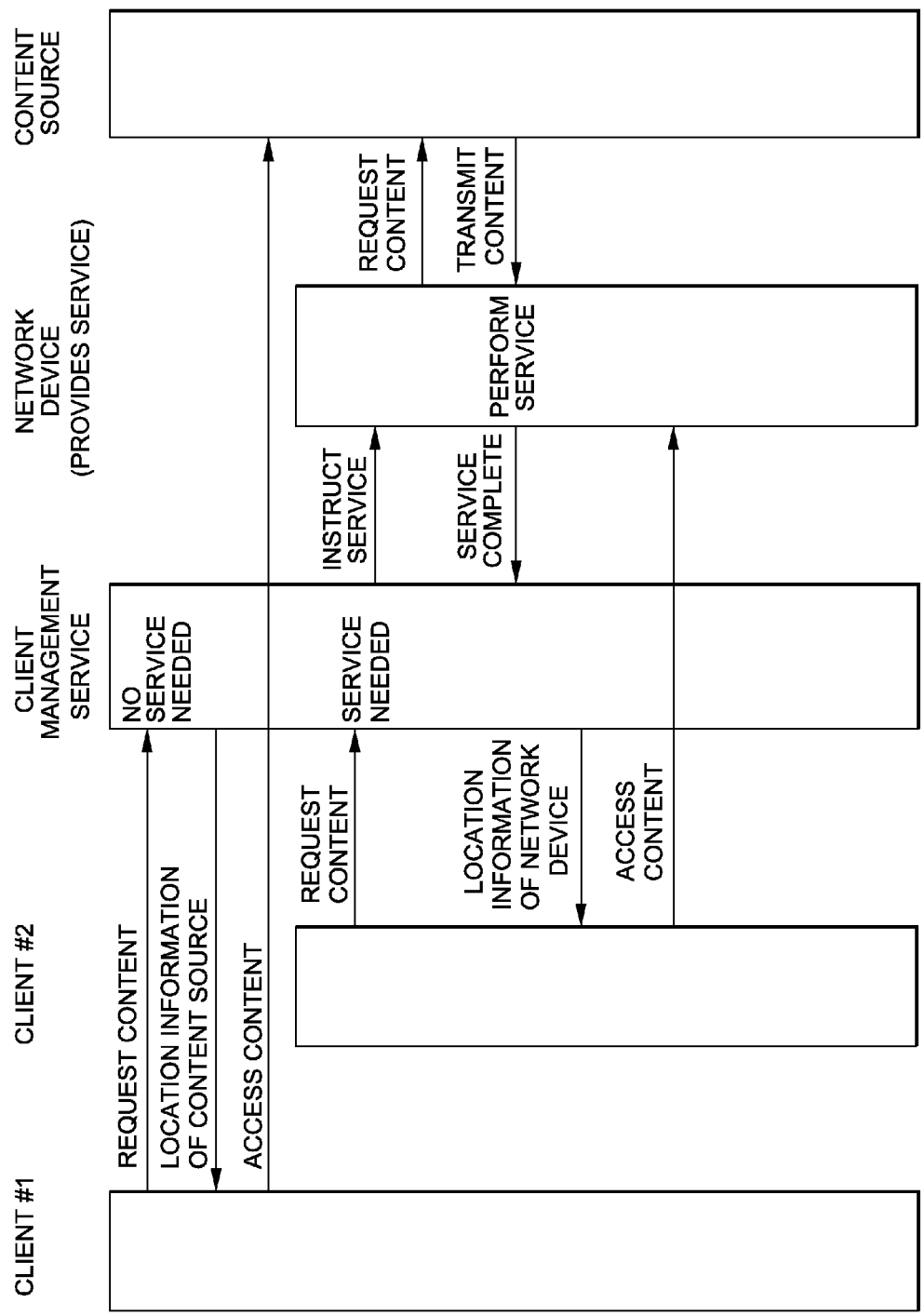
FIG. 5 is a view for explaining interactions with a content management service according to an example embodiment.

FIG. 5 is a view for explaining interactions with a content management service according to an example embodiment.

In particular, FIG. 5 depicts interactions between Client #1, Client #2, a content management service, a network device, and a content source. In the example shown in FIG. 5, Client #1 has capabilities corresponding to the content it requests, whereas Client #2 lacks the capabilities to access its requested content directly.

More specifically, as seen in FIG. 5, Client #1 requests content from the content management service. The content management service module determines that no additional services are needed for Client #1 to access the content, and therefore transmits location information of the content source back to Client #1. Client #1 thereby accesses the content directly from the content source.

In contrast, Client #2 transmits a request for content, but the content management service determines that Client #2 does require additional services. Accordingly, the content management service instructs the network device to perform the service. The network device requests and receives the content from the content source, and performs the service required by Client #2. The network device informs the content management service that the service is complete. The, the content management service transmits location information of the network device to Client #2, which accesses the transformed content from the network device (instead of directly from the content source).

Figure 6:
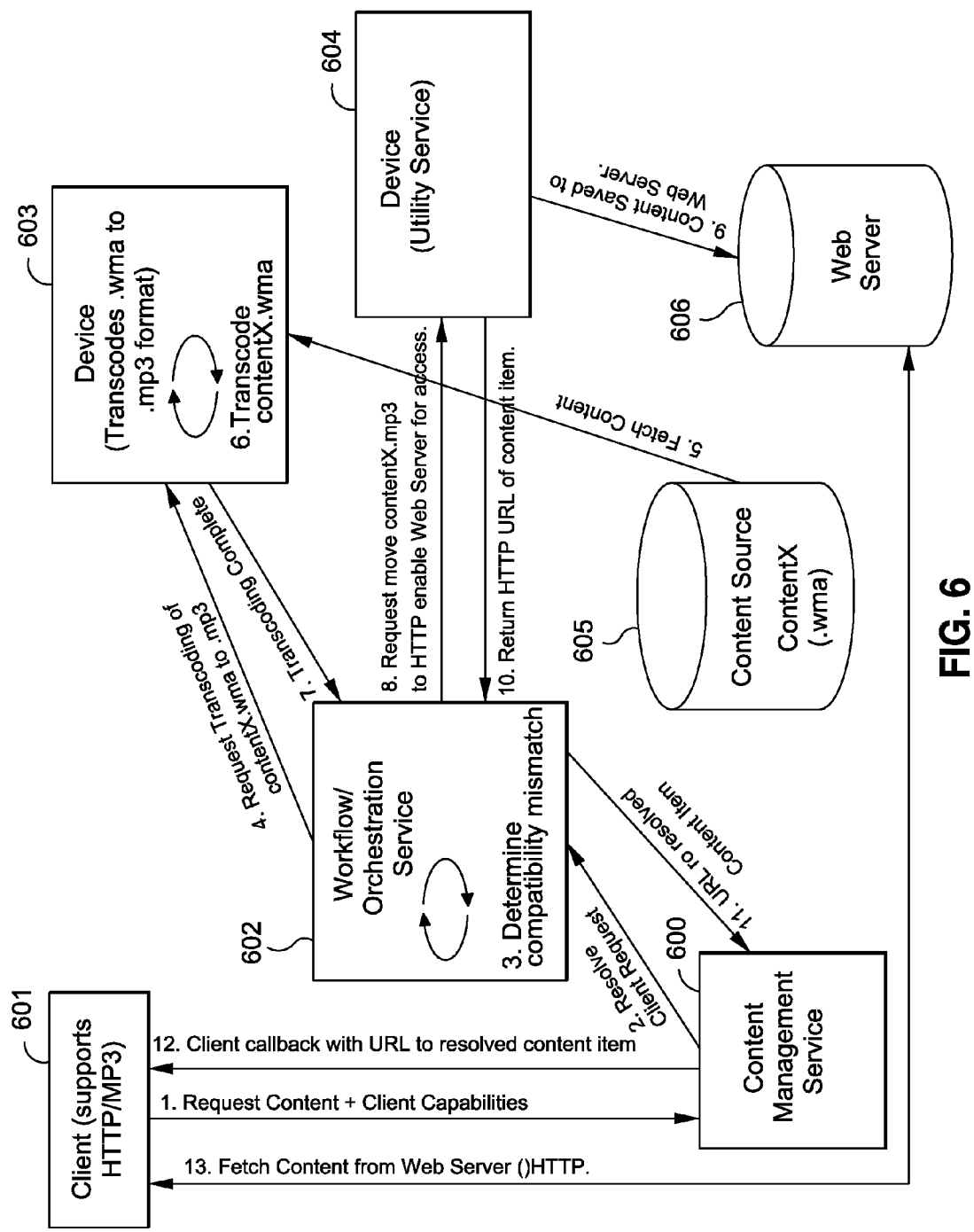
FIG. 6 is a view for explaining construction of a workflow according to an example embodiment.

FIG. 6 is a view for explaining construction of a workflow according to an example embodiment.

In particular, FIG. 6 depicts an example embodiment in which the content management service determines whether the client device and the content source can communicate directly by enlisting another device. Specifically, in this embodiment, the content management service determines whether the client device does or does not have capabilities corresponding to the content identified by the request by forwarding the request and capability information to a workflow/orchestration service on another device. Thus, the content management service delegates tasks to another resource on the network to provide communication between the client device and the content source.

As seen in FIG. 6, client 601 communicates with content management service 600. Content management service 600 communicates with workflow/orchestration service 602, which in turn communicates with device 603 and device 604. Device 603 communicates with content source 605, and device 604 communicates with web server 606.

In that regard, content management service enlists workflow/orchestration service 602 to assist in determining whether the client device does or does not have capabilities corresponding to the content identified by the request. In addition, device 603 and device 604 provide additional capabilities needed by client device 601 to access the content provided by content source 605.

In more detail, the process begins when client 601 transmits a request for content and capability information to content management service 600.

Next, content management service 600 resolves the client request. However, rather than determining whether the client device does or does not have capabilities corresponding to the content identified by the request itself as described above, content management service 600 forwards the client request to workflow/orchestration service 602 to make this determination. Workflow/orchestration service 602 determines a compatibility mismatch between the client capabilities and the content identified by the client request.

Upon determining a mismatch, workflow/orchestration service 602 determines that transcoding is required in order for the client device to access the content. Accordingly, workflow/orchestration service 602 transmits a request for transcoding to device 603. Device 603 fetches the identified content (ContentX.wma) from content source 605, and transcodes ContentX.wma. Device 603 then informs workflow/orchestration service 602 that the transcoding is complete.

Once the transcoding is complete, workflow/orchestration service 602 requests to move contentX.mp3 to an HTTP enabled Web Server, so that client device 601 (which supports HTTP/MP3) can access the content. Device 604 saves the content to HTTP-enabled Web Server 606, and returns the HTTP URL of the content item back to workflow/orchestration service 602. Workflow/orchestration service 602 returns the URL to the resolved content item to content management service 600, which calls back client 601 with the URL to the resolved content item. Client device 601 then fetches the content item from Web Server 606.

Thus, in the example embodiment shown in FIG. 6, content management service 600 enlists not only devices 603 and 604 to provide services necessary for client device 601 to access the content, but also enlists workflow/orchestration service 602 to guide the workflow between the various devices and services on the network.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for providing content to a client device, wherein the client device communicates with other devices over a network, comprising:

receiving a request from the client device at a content management service which has access to a database of content on the network and a database of devices on the network, wherein the request identifies content requested by a client;

designating, with the content management service, a content source which stores the content identified by the request;

receiving, by at least one hardware unit, capability information from the client device; and determining, with the content management service, whether the client device does or does not have capabilities corresponding to the content identified by the request, wherein the determination is made using the capability information, responsive to a determination that the client device has capabilities corresponding to the content identified by the request, providing the client device with information to facilitate direct communication between the client device and the content source over the network, and responsive to a determination that the client device does not have capabilities corresponding to the content identified by the request, constructing a communication channel over the network between the client device and one or more other devices which have capabilities corresponding to the content identified by the request;

wherein the content management service determines whether the client device does or does not have capabilities corresponding to the content identified by the request by forwarding the request and capability information to a workflow-orchestration service on another device which performs the determination.

2. The method according to claim 1, wherein the content management service constructs the communication channel by informing the client device of a location of one of the other devices, and wherein the one of the other devices receives the content identified by the request and provides the content identified by the request to the client device.

3. The method according to claim 1, wherein the content management service facilitates direct communication between the client device and the content source by providing the client device with location information of the content source, and wherein the client device accesses the content from the content source using the location information.

4. The method according to claim 1, wherein the content management service determines whether the client device has capabilities corresponding to the content identified by the request by determining whether the client device and the content source can communicate directly.

5. The method according to claim 4, wherein the content management service determines whether the client device and the content source can communicate directly by determining whether an identity of the network of the client device is the same as an identity of the network of the content source.

6. The method according to claim 5, wherein the content management service determines whether the identity of the network of the client device is the same as the identity of the network of the content source by comparing unique network identifiers which are generated for each network.

7. The method according to claim 6, wherein the unique network identifier for each network is generated by a first node activated on each network.

8. The method according to claim 6, wherein the unique network identifier for each network is generated by a respective network router node on each network.

9. The method according to claim 4, wherein the content management service determines whether the client device and the content source can communicate directly by determining whether the client device and content source have a transport protocol in common.

10. The method according to claim 4, wherein the content management service determines whether the client device and the content source can communicate directly by determining whether or not the client device and content source both support content in the same content representation format.

11. The method according to claim 4, wherein the content management service determines whether the client device and the content source can communicate directly by determining whether bandwidth between the client device and the content source allows for adequate consumption of content between the client device and the content source.

12. The method according to claim 4, wherein the content management service determines whether the client device and the content source can communicate directly by determining whether the client device can provide security credentials requested by the content source.

13. The method according to claim 1, wherein the content management service delegates tasks to another resource on the network to provide communication between the client device and the content source.

14. The method according to claim 1, wherein the client device requests content by selecting an item or a set of items from a metadata list provided by the content management service.

15. The method according to claim 1, wherein the content management service uses the functions of a network service to perform designated operations, such as transcoding, to facilitate access of the content from the content source.

16. The method according to claim 1, wherein a number of devices used to satisfy the request is determined based on a number of capability mismatches between the client capabilities and the content identified by the request.

17. The method according to claim 16, wherein when more than one device is used to satisfy the request, a workflow is generated which includes the services of the devices and the content source, and which ends with the client device receiving the content.

18. A communication apparatus for providing content to a client device, wherein the client device communicates with other devices over a network, comprising:

a computer-readable memory constructed to store computer-executable process steps; and a processor constructed to execute the computer-executable process steps stored in the memory;

wherein the process steps stored in the memory cause the processor to:

receive a request from the client device at a content management service which has access to database of content on the network and a database of devices on the network, wherein the request identifies content requested by a client;

designate, with the content management service, a content source which stores the content identified by the request;

receive capability information from the client device; and determine, with the content management service, whether the client device does or does not have capabilities corresponding to the content identified by the request, wherein the determination is made using the capability information, responsive to a determination that the client device has capabilities corresponding to the content identified by the request, provide the client device with information to facilitate direct communication between the client device and the content source over the network, and responsive to a determination that the client device does not have capabilities corresponding to the content identified by the request, construct a communication channel over the network between the client device and one or more other devices which have capabilities corresponding to the content identified by the request;

wherein the content management service determines whether the client device does or does not have capabilities corresponding to the content identified by the request by forwarding the request and capability information to a workflow-orchestration service on another device which performs the determination.

19. The apparatus according to claim 18, wherein the content management service constructs the communication channel by informing the client device of a location of one of the other devices, and wherein the one of the other devices receives the content identified by the request and provides the content identified by the request to the client device.

20. The apparatus according to claim 18, wherein the content management service facilitates direct communication between the client device and the content source by providing the client device with location information of the content source, and wherein the client device accesses the content from the content source using the location information.

21. The apparatus according to claim 18, wherein the content management service determines whether the client device has capabilities corresponding to the content identified by the request by determining whether the client device and the content source can communicate directly.

22. The apparatus according to claim 21, wherein the content management service determines whether the client device and the content source can communicate directly by determining whether an identity of the network of the client device is the same as an identity of the network of the content source.

23. The apparatus according to claim 22, wherein the content management service determines whether the identity of the network of the client device is the same as the identity of the network of the content source by comparing unique network identifiers which are generated for each network.

24. The apparatus according to claim 23, wherein the unique network identifier for each network is generated by a first node activated on each network.

25. The apparatus according to claim 23, wherein the unique network identifier for each network is generated by a respective network router node on each network.

26. The apparatus according to claim 21, wherein the content management service determines whether the client device and the content source can communicate directly by determining whether the client device and content source have a transport protocol in common.

27. The apparatus according to claim 21, wherein the content management service determines whether the client device and the content source can communicate directly by determining whether or not the client device and content source both support content in the same content representation format.

28. The apparatus according to claim 21, wherein the content management service determines whether the client device and the content source can communicate directly by determining whether bandwidth between the client device and the content source allows for adequate consumption of content between the client device and the content source.

29. The apparatus according to claim 21, wherein the content management service determines whether the client device and the content source can communicate directly by determining whether the client device can provide security credentials requested by the content source.

30. The apparatus according to claim 18, wherein the content management service delegates tasks to another resource on the network to provide communication between the client device and the content source.

31. The apparatus according to claim 18, wherein the client device requests content by selecting an item or a set of items from a metadata list provided by the content management service.

32. The apparatus according to claim 18, wherein the content management service uses the functions of a network service to perform designated operations, such as transcoding, to facilitate access of the content from the content source.

33. The apparatus according to claim 18, wherein a number of devices used to satisfy the request is determined based on a number of capability mismatches between the client capabilities and the content identified by the request.

34. The apparatus according to claim 33, wherein when more than one device is used to satisfy the request, a workflow is generated which includes the services of the devices and the content source, and which ends with the client device receiving the content.

35. A content management service module for providing content to a client device, wherein the client device communicates with other devices over a network, comprising:
at least one hardware unit;
a first receiving module for receiving a request from the client device, wherein the request identifies content requested by a client;
a designation module for designating a content source which stores the content identified by the request, wherein the designation is made based on access to databases of content and devices on the network;
a second receiving module for receiving capability information from the client device; and
a determination module for determining whether the client device does or does not have capabilities corresponding to the content identified by the request, wherein the determination is made using the capability information,
a communication facilitation module for providing the client device with information to facilitate direct communication between the client device and the content source over the network, responsive to a determination that the client device has capabilities corresponding to the content identified by the request, and for constructing a communication channel over the network between the client device and one or more other devices which have capabilities corresponding to the content identified by the request, responsive to a determination that the client device does not have capabilities corresponding to the content identified by the request;
wherein the content management service determines whether the client device does or does not have capabilities corresponding to the content identified by the request by forwarding the request and capability information to a workflow-orchestration service on another device which performs the determination.

36. The content management service module according to claim 30, wherein the content management service constructs the communication channel by informing the client device of a location of one of the other devices, and wherein the one of the other devices receives the content identified by the request and provides the content identified by the request to the client device.

37. The content management service module according to claim 35, wherein the content management service facilitates direct communication between the client device and the content source by providing the client device with location information of the content source, and wherein the client device accesses the content from the content source using the location information.

38. The content management service module according to claim 35, wherein the content management service determines whether the client device has capabilities corresponding to the content identified by the request by determining whether the client device and the content source can communicate directly.

39. The content management service module according to claim 38, wherein the content management service determines whether the client device and the content source can communicate directly by determining whether an identity of the network of the client device is the same as an identity of the network of the content source.

40. The content management service module according to claim 39, wherein the content management service determines whether the identity of the network of the client device is the same as the identity of the network of the content source by comparing unique network identifiers which are generated for each network.

41. The content management service module according to claim 40, wherein the unique network identifier for each network is generated by a first node activated on each network.

42. The content management service module according to claim 40, wherein the unique network identifier for each network is generated by a respective network router node on each network.

43. The content management service module according to claim 38, wherein the content management service determines whether the client device and the content source can communicate directly by determining whether the client device and content source have a transport protocol in common.

44. The content management service module according to claim 38, wherein the content management service determines whether the client device and the content source can communicate directly by determining whether or not the client device and content source both support content in the same content representation format.

45. The content management service module according to claim 38, wherein the content management service determines whether the client device and the content source can communicate directly by determining whether bandwidth between the client device and the content source allows for adequate consumption of content between the client device and the content source.

46. The content management service module according to claim 38, wherein the content management service determines whether the client device and the content source can communicate directly by determining whether the client device can provide security credentials requested by the content source.

47. The content management service module according to claim 35, wherein the content management service delegates tasks to another resource on the network to provide communication between the client device and the content source.

48. The content management service module according to claim 35, wherein the client device requests content by selecting an item or a set of items from a metadata list provided by the content management service.

49. The content management service module according to claim 35, wherein the content management service uses the functions of a network service to perform designated operations, such as transcoding, to facilitate access of the content from the content source.

50. The content management service module according to claim 35, wherein a number of devices used to satisfy the request is determined based on a number of capability mismatches between the client capabilities and the content identified by the request.

51. The content management service module according to claim 50, wherein when more than one device is used to satisfy the request, a workflow is generated which includes the services of the devices and the content source, and which ends with the client device receiving the content.

52. A non-transitory computer-readable storage medium storing a computer-executable program for causing a computer to perform a method for providing content to a client device, wherein the client device communicates with other devices over a network, the method comprising:
   receiving a request from the client device at a content management service which has access to a database of content on the network and a database of devices on the network, wherein the request identifies content requested by a client;
   designating, with the content management service, a content source which stores the content identified by the request;
   receiving capability information from the client device; and
   determining, with the content management service, whether the client device does or does not have capabilities corresponding to the content identified by the request, wherein the determination is made using the capability information,
   responsive to a determination that the client device has capabilities corresponding to the content identified by the request, providing the client device with information to facilitate direct communication between the client device and the content source over the network, and
   responsive to a determination that the client device does not have capabilities corresponding to the content identified by the request, constructing a communication channel over the network between the client device and one or more other devices which have capabilities corresponding to the content identified by the request;
   wherein the content management service determines whether the client device does or does not have capabilities corresponding to the content identified by the request by forwarding the request and capability information to a workflow-orchestration service on another device which performs the determination.

53. The computer-readable storage medium according to claim 52, wherein the content management service constructs the communication channel by informing the client device of a location of one of the other devices, and wherein the one of the other devices receives the content identified by the request and provides the content identified by the request to the client device.

54. The computer-readable storage medium according to claim 52, wherein the content management service facilitates direct communication between the client device and the content source by providing the client device with location information of the content source, and wherein the client device accesses the content from the content source using the location information.

55. The computer-readable storage medium according to claim 52, wherein the content management service determines whether the client device has capabilities corresponding to the content identified by the request by determining whether the client device and the content source can communicate directly.

56. The computer-readable storage medium according to claim 55, wherein the content management service determines whether the client device and the content source can communicate directly by determining whether an identity of the network of the client device is the same as an identity of the network of the content source.

57. The computer-readable storage medium according to claim 56, wherein the content management service determines whether the identity of the network of the client device is the same as the identity of the network of the content source by comparing unique network identifiers which are generated for each network.

58. The computer-readable storage medium according to claim 57, wherein the unique network identifier for each network is generated by a first node activated on each network.

59. The computer-readable storage medium according to claim 57, wherein the unique network identifier for each network is generated by a respective network router node on each network.

60. The computer-readable storage medium according to claim 55, wherein the content management service determines whether the client device and the content source can communicate directly by determining whether the client device and content source have a transport protocol in common.

61. The computer-readable storage medium according to claim 55, wherein the content management service determines whether the client device and the content source can communicate directly by determining whether or not the client device and content source both support content in the same content representation format.

62. The computer-readable storage medium according to claim 55, wherein the content management service determines whether the client device and the content source can communicate directly by determining whether bandwidth between the client device and the content source allows for adequate consumption of content between the client device and the content source.

63. The computer-readable storage medium according to claim 55, wherein the content management service determines whether the client device and the content source can communicate directly by determining whether the client device can provide security credentials requested by the content source.

64. The computer-readable storage medium according to claim 52, wherein the content management service delegates tasks to another resource on the network to provide communication between the client device and the content source.

65. The computer-readable storage medium according to claim 52, wherein the client device requests content by selecting an item or a set of items from a metadata list provided by the content management service.

66. The computer-readable storage medium according to claim 52, wherein the content management service uses the functions of a network service to perform designated operations, such as transcoding, to facilitate access of the content from the content source.

67. The computer-readable storage medium according to claim 52, wherein a number of devices used to satisfy the request is determined based on a number of capability mismatches between the client capabilities and the content identified by the request.

68. The computer-readable storage medium according to claim 67, wherein when more than one device is used to satisfy the request, a workflow is generated which includes the services of the devices and the content source, and which ends with the client device receiving the content.

* * * * *